United States Patent
Coleman

(10) Patent No.: US 11,195,075 B2
(45) Date of Patent: *Dec. 7, 2021

(54) ANGLED SLOT IN A TRANSACTION CARD

(71) Applicant: American Express Travel Related Services Company, Inc., New York, NY (US)

(72) Inventor: James Bruce Coleman, Phoenix, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/150,489

(22) Filed: Jan. 15, 2021

(65) Prior Publication Data

US 2021/0133530 A1    May 6, 2021

Related U.S. Application Data

(63) Continuation of application No. 16/410,719, filed on May 13, 2019, now Pat. No. 10,909,436.

(51) Int. Cl.
*G06K 19/077* (2006.01)
*G06K 19/063* (2006.01)

(52) U.S. Cl.
CPC ..... *G06K 19/07722* (2013.01); *G06K 19/063* (2013.01)

(58) Field of Classification Search
None
See application file for complete search history.

(56) References Cited

U.S. PATENT DOCUMENTS

| | | | |
|---|---|---|---|
| 5,647,122 A | | 7/1997 | Launay et al. |
| 6,519,497 B1 * | | 2/2003 | Blome ............ B23Q 17/24 700/114 |
| 10,909,436 B2 * | | 2/2021 | Coleman ........... G06K 19/063 |
| 2004/0062012 A1 | | 4/2004 | Murohara |
| 2008/0072423 A1 | | 3/2008 | Finn |
| 2015/0069131 A1 | | 3/2015 | Scanlon et al. |
| 2015/0269477 A1 | | 9/2015 | Finn et al. |
| 2019/0329583 A1 | | 10/2019 | Herrington et al. |

FOREIGN PATENT DOCUMENTS

| KR | 20190025145 | 3/2019 |
|---|---|---|
| WO | 2018202774 | 11/2018 |

OTHER PUBLICATIONS

International Search Report in PCT/US2020/032420 dated Aug. 27, 2020.

* cited by examiner

*Primary Examiner* — Kristy A Haupt
(74) *Attorney, Agent, or Firm* — Thomas Horstemeyer, LLP

(57) ABSTRACT

The disclosure includes a transaction card comprising a card body having a slot. A first portion of the slot is formed at a first angle, and a third portion of the slot is formed at a third angle. A card body may be fabricated by positioning the card body at a first angle with respect to a cutter, creating a first portion of a slot at the first angle by at least one of translating the card body across the cutter or translating the cutter across the card body, stopping the translating of the card body, rotating the card body to a third angle to create a second portion of the slot; and creating a third portion of the slot at the third angle by at least one of translating the card body across the cutter or translating the cutter across the card body.

20 Claims, 4 Drawing Sheets

ANGLED SLOT IN A TRANSACTION CARD

CROSS-REFERENCE TO RELATED APPLICATION

This application is a continuation of copending U.S. patent application Ser. No. 16/410,719, entitled "ANGLED SLOT IN A TRANSACTION CARD" and filed on May 13, 2019, which is incorporated by reference as if set forth herein in its entirety.

FIELD

This disclosure generally relates to a transaction card, and more particularly, to an angled slot in a card body of a transaction card.

BACKGROUND

Typical transaction cards are made from thermoplastic materials, such as polyvinyl chloride (PVC) and polyethylene terephthalate (PET). However, these transaction cards are susceptible to being damaged or destroyed if exposed to damaging environments. For example, transaction cards may be damaged if left exposed to the elements for an extended period of time. Moisture and/or sunlight may break down the chemical bonds within the polymers of typical transaction cards, such that transaction cards left exposed to moisture and sunlight may become warped, cracked and/or unusable. In addition, thermoplastic transaction cards may be easily bent or may be broken or cut, thereby damaging the transaction card and rendering it unusable.

To reduce some of the problems with the thermoplastic materials, transaction cards started to be fabricated with different types of metal and/or metal alloys to provide more durability and a higher status symbol. One issuer such as American Express® may issue millions of such metal cards to account holders each year. However, metal transaction cards may impact the functionality of integrated circuits with antennas. In particular, the metal card body may reduce or prevent the distribution of EM signals from the EMV chip through the metal card body. To help facilitate the distribution of EM signals from the EMV chip through the metal card body, metal transaction cards have included a slit in the card body. For example, a continuous 90 degree cut that is about 60 microns wide and through the card body, from the edge of the card to about ¾ of an inch into the card and through the chip milling area. The continuous 90 degree cut may be a straight line cut, a stepped cut or a squiggle cut.

However, such a cut tends to be a weak point in the planar surface. In particular, transaction cards are often pulled, bent, twisted and/or torqued in different ways (e.g., when removing from a wallet, inserting into an ATM, etc.). Such actions often put strain on the cut area causing the cut to further separate, the cut to extend further into the card and/or the part of the card next to the cut to crack. In particular, opposite pressure on either edge of the cut may split the card or break the EMV chip.

Therefore, a need exists for a transaction card that has strength, durability and withstands exposure to the elements, while also avoiding or minimizing the impact of the distribution of EM signals from the EMV chip through the metal card body.

SUMMARY

In various embodiments, the disclosure includes a transaction card comprising a card body having a slot. A first portion of the slot is formed at a first angle relative to a plane of the card body, and a third portion of the slot is formed at a third angle relative to the plane of the card body. The slot may include a second portion having a second angle. The second portion may connect the first portion and the third portion. The first portion, the second portion and the third portion may form a step shape. The second portion may be perpendicular to the first portion and the third portion. The first angle may be about 45 degrees with respect to a plane of the card body and the third angle may about 135 degrees with respect to a plane of the card body. In other embodiments, the first angle may be about 60 degrees with respect to a plane of the card body and the third angle is about 150 degrees with respect to a plane of the card body. At least a portion of the third portion of the slot may extend under an EMV chip. The first portion begins at an edge of the card body. An EMV chip may be within a pocket in the card body and the pocket may include an aperture through the card body. The card body may also include at least one of a diamond like carbon (DLC) coating, ceramic, PVD, Ink, PVC laminate or other materials over at least a portion of the card body. The card body may include a metallic material comprising at least one of titanium, aluminum, or stainless steel. The card body may also include a marking, perforation, etching, relief or finishing features.

In various embodiments, a method of fabricating a card body may comprise positioning the card body at a first angle with respect to a cutter; creating a first portion of a slot in the card body at the first angle by at least one of translating the card body across the cutter or translating the cutter across the card body; stopping the translating of the card body; rotating at least one of the card body or the cutter to a third angle to create a second portion of the slot; and creating a third portion of the slot in the card body at the third angle by at least one of translating the card body across the cutter or translating the cutter across the card body. The translating the transaction card across the cutter may include creating a third portion of the slot that ends underneath an EMV chip.

Additional features and advantages of the present invention are described in, and will be apparent from, the detailed description of the various embodiments and from the drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
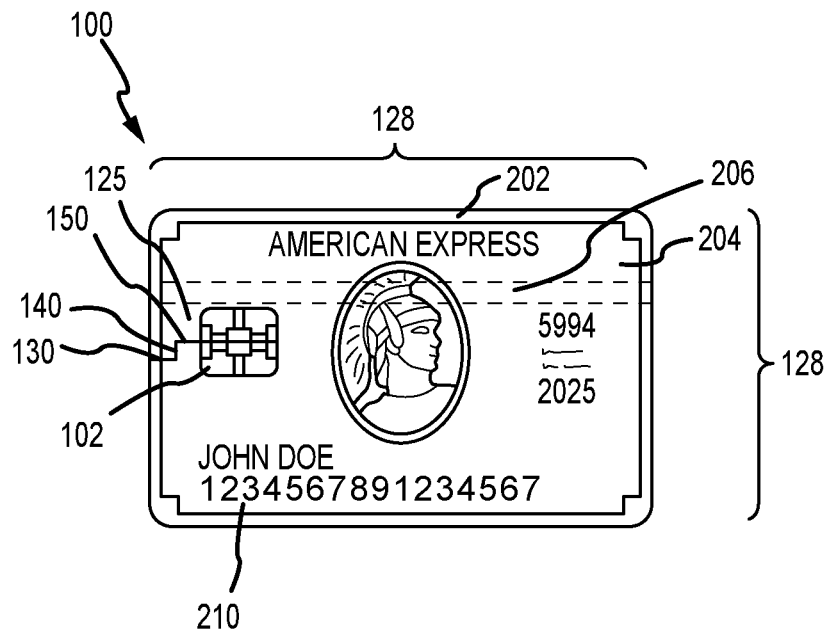
FIG. 1 is a drawing of a front view of a transaction card showing an exemplary slot and other features, in accordance with various embodiments.

FIG. 1 illustrates a transaction card 100 showing primary surface 204. The transaction card 100 may be composed of card body 110 which may comprise any material disclosed herein. The transaction card 100 includes a width 126 relative to height 128. Primary surface 204 and secondary surface 208 may include a DLC coating and various features that are produced through marking, finishing, etching, and/or perforation, as described herein. Primary surface 204 may comprise one or more of a matte surface and a glossy surface. In various embodiments, primary surface 204 may be polished to a glossy, highly reflective surface. Finishing may be used to transform a portion of the glossy surface to a matte finish.

Figure 2:
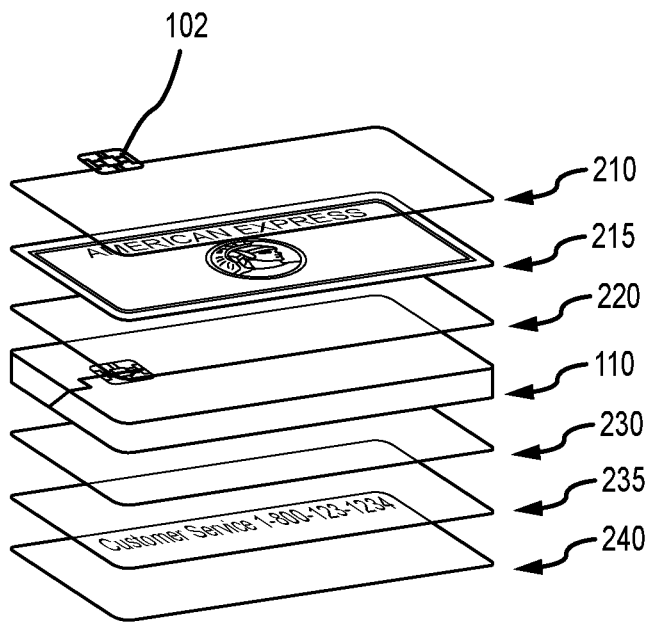
FIG. 2 is a drawing of various layers of a transaction card, in accordance with various embodiments.

In various embodiments, and with reference to FIG. 2, fabricating the transaction card 100 may include creating different layers of the transaction card 100. The overall transaction card 100 may include various layers including, for example, one or more of a diamond clear coating 210, raised letter printing 215, black ceramic coating 220, card body 110 comprised of a stainless steel inlay with antenna, a glue lam 230, a black PVC print layer 235 and a clear laminate 240 with a magnetic stripe 206 or signature panel (e.g., milled within the laminate).

Figure 3:
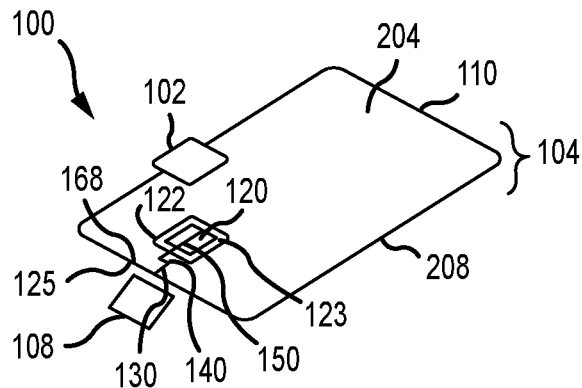
FIG. 3 is a drawing showing the details of a pocket within a card body, in accordance with various embodiments.
Figure 4:
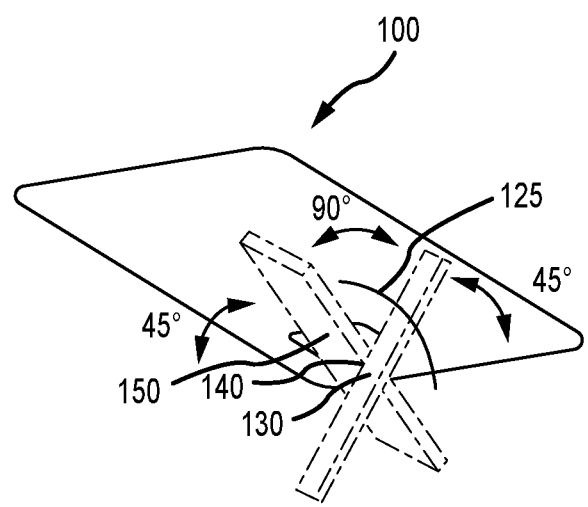
FIG. 4 is a drawing showing exemplary angles of the slots in a card body, in accordance with various embodiments.

As shown in FIGS. 1, 3 and 4, in various embodiments, any layer of the transaction card 100 (e.g., card body 110) may include an angled slot 125 having a first portion 130, a second portion 140 and a third portion 150 in the card body 110. The slot 125 may be, for example, about 60 microns wide (a typical transaction card thickness 104 is about 760 (+/−10%) microns). Slot 125 may pass through the entire thickness 104 of card body 110, though in various embodiments slot 125 may be a score or channel within card body 110. The angled slot 125 may be in the form of a "French cleat". In that regard, the transaction card includes multiple slots 125 (or multiple portions of a slot 125) formed from different angles. As such, the angled slot 125 may prevent or minimize separation. In particular, the angled slot 125 may prevent or minimize separation when pressure is applied to the card from opposite sides. If just one angled slot 125 is used (e.g., just the first portion 130 or just the third portion 150), reverse pressure points on either side of the slot 125 may still split the card and/or break the EMV chip 102.

As shown in FIGS. 3 and 4, the slot 125 may start at an edge of the card body 110 and end below the EMV chip 102. In particular, the third portion 150 of the slot 125 may end at a far edge of an aperture 120 within a pocket 122 (the far aperture edge is the aperture edge farthest from the card edge 168 where the slot 125 starts). In particular, the card body 110 may include a pocket 122 that houses the EMV chip 102. Pocket 122 may be created by any device or process that may form the pocket such as by milling, laser cutting, chemical etching, whittling, etc. The pocket 122 may be centered at about 0.601 inches from the closer side of the card and 0.895 inches from the top of the card. The pocket 122 may include an aperture 120 in the center of the pocket 122. The pocket 122 includes a recessed ledge 123 within the pocket 122 and the recessed ledge 123 surrounds the aperture 120. Thus, the outer rim of the EMV chip 102 may rest on the recessed ledge 123, while the center of the EMV chip 102 is suspended over the aperture 120.

As shown in FIGS. 1 and 4, the angled slot 125 may communicate with the antenna in the EMV chip 102. The EMV standard governs how payment cards and point of sale (POS) terminals interact to facilitate purchases and withdrawals in a fast and secure manner. The EMV standard also enables verifications of payments. The EMV chip 102 uses capacitive coupling and/or inductive coupling to facilitate an exchange of data communication and energy with a contactless reader. EMV chip 102 also drives active elements such as, for example, for integrating into payment objects and identification objects. As such, when the transaction card is waved over a POS terminal, the POS terminal may send out an EM field with EM energy. The slot 125 may focus energy above and/or below the slot 125. The card body 110 that is metal absorbs the EM energy and the slot 125 acts as a contactless antenna, so the EM energy is focused into the slot 125. As discussed above, the slot 125 overlaps with the EMV chip 102, so in an EM field, the surface current around the slot 125 may provide the power delivery to the EMV chip 102 by coupling the EM energy to the inductive coupling contact pad that includes a module antenna of the EMV chip 102. The coupling may be a reactive coupling that includes a combination of capacitive and inductive coupling.

In various embodiments, each portion may be formed at any angle and be any length. As shown in FIGS. 3 and 4, first portion 130 of slot 125 may be in a range of between about 35 degrees to about 70 degrees with respect to the plane of the card body. For example, first portion may be at an about 45 degree angle from the plane of the card. The length of first portion 130 may be in a range of between about 0.1875-0.25 inches into the card from an edge 168 of the card. For example, the length may be about ⅜, ¼ or 3/16 inches in various embodiments. However, the length of the first portion 130 may vary depending on the size of the contact pad and pocket 122. The second portion 140 is formed substantially perpendicular to the first portion 130 based on rotating the card about 90 degrees. The second portion may be formed with an about 90 degree angle from the plane of the card. The third portion 150 of the slot 125 may be in a range of between about 90 degrees and about 160 degrees with respect to the plane of the card body. For example, third portion 150 may be at an opposite about 45 degree angle from the plane of the card (i.e., 135 degree angle from the original plane of the card). Third portion 150 may be in a range of between about 0.5 inches to about 0.75 inches in length. For example, the length of the third portion 150 may be about 0.69 inches. This may leave about 800 microns of overlap in each direction (i.e., the horizontal distance between the top cut of the slot 125 to the bottom cut of the slot 125), with a length within the angled slot 125 of about 1131 microns (i.e., the angled distance between the top cut of the slot 125 to the bottom cut of the slot 125).

In other embodiments, the first portion 130 of the slot 125 may be at an about 60 degree angle from the plane of the card. The third portion 150 of the slot 125 may be about 0.69 inches in length and may be at an opposite about 60 degree angle from the plane of the card (i.e., 150 degree angle). This may leave about 1385 microns of overlap in each direction, with a length of the angled slot 125 of about 1600 microns.

Figure 7:
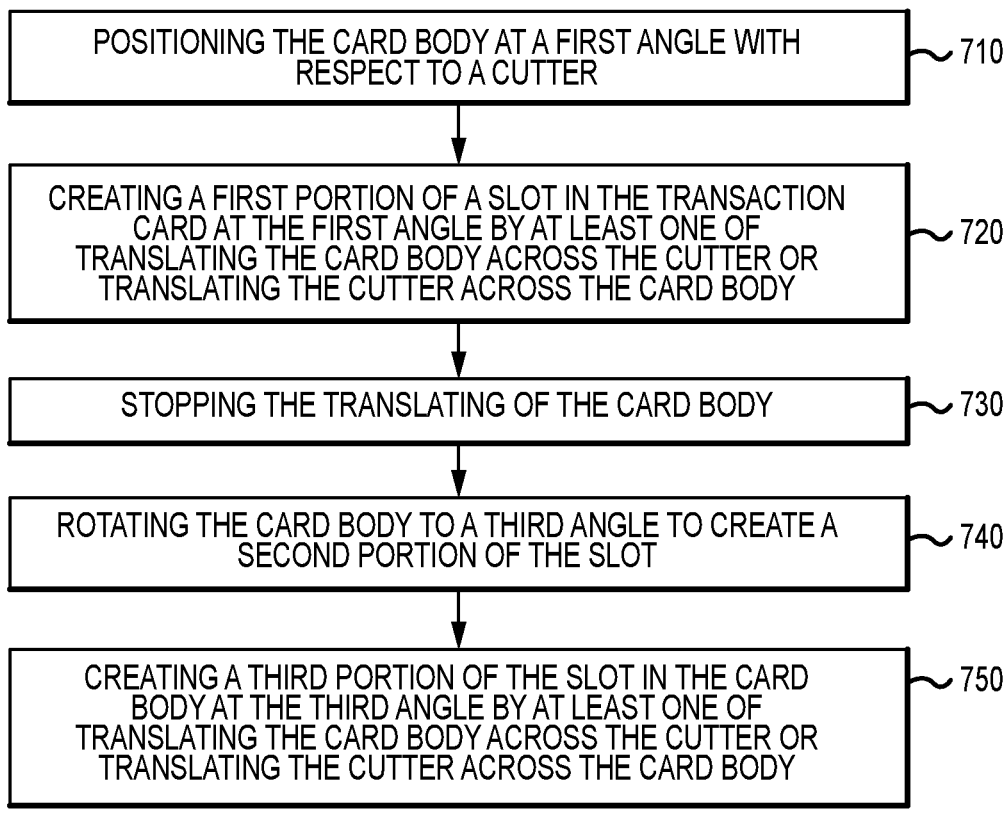
FIG. 7 is an exemplary flowchart showing the process for creating a transaction card, in accordance with various embodiments.

The slot 125 may be formed into the card. In various embodiments, the slot 125 may be formed by cutting the slot 125 out of the card body 110 (e.g., laser cutter). The card body 110 may be pushed through the cutter or the cutter may move across the card body 110. The cutter may be mounted to a 3D robot arm, to allow the cutter to move across the card body 110. A jig may translate the card body 110 through a perpendicular cutter (e.g., laser beam). The card body 110 may move a little more than about 0.5 inches when forming all of the first portion 130, second portion 140 and third portion 150 of the slot 125. As set forth in FIG. 7, the card body is positioned at a first angle with respect to the cutter (step 710). The device creates a first portion of a slot in the card body at the first angle by at least one of translating the card body across the cutter or translating the cutter across the card body (step 720). After completing the first portion 130, the card body 110 or cutter is no longer translated (step 730), then the card body 110 or cutter may be rotated about 90 degrees (step 740). Such rotation causes a second portion 140 of the slot 125 to be formed substantially perpendicular to the first portion 130. The card body 110 or cutter is then translated again to form the third portion 150 (step 750).

Figure 5:
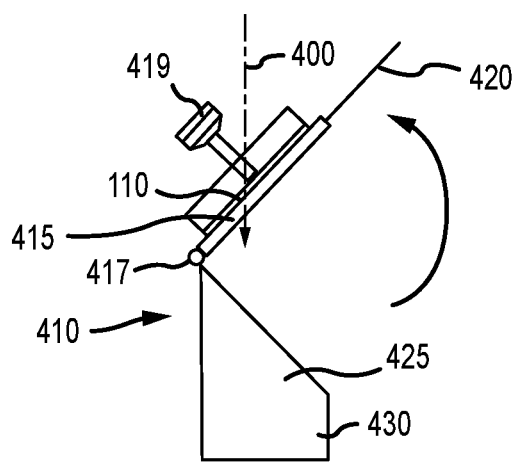
FIG. 5 is a drawing of an exemplary jig for rotating a card body, in accordance with various embodiments.

In various embodiments, the fabrication of the slot 125 may completed with a jig (e.g., laser jig), as set forth in FIG. 5. In particular, the card may be placed on mounting device 410 of a jig that moves the card through a perpendicular cutter 400 (e.g., laser cutter) or cutter 400 translates over the jig. The mounting device 410 may include a lifting table 415 that includes a hinge 417 on one end of the lifting table 415 and a guide handle 420 on the other end of the lifting table 415. A card locking mechanism 419 holds the card against a front face of the lifting table 415. The hinge 417 rotatably connects the lifting table 415 to an about 45 degree block 425. The 45 degree block 425 is mounted on a slide block 430. The cutter 400 may be fixed perpendicular to the mounting device 410, but the lifting table 415 may be rotated around its hinge 417 from about −45 degrees to about +45 degrees.

Figure 6:
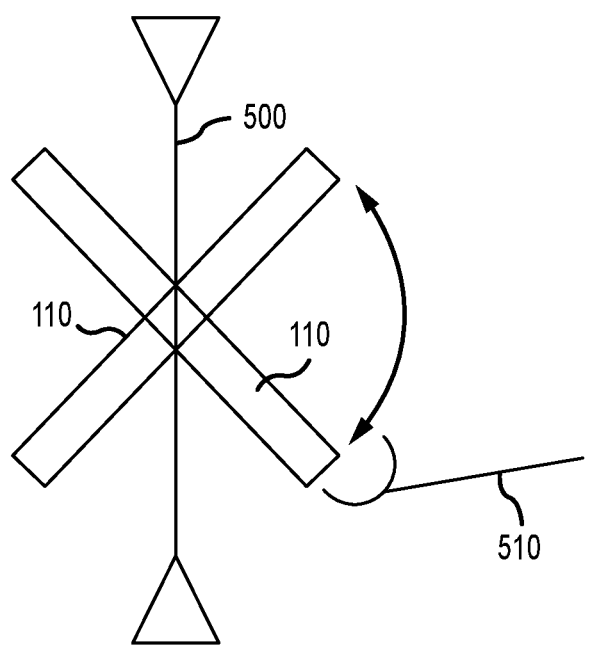
FIG. 6 is a drawing of an exemplary robotic arm system for rotating a card body, in accordance with various embodiments.

In various embodiments, the fabrication of the slot 125 may be completed with a robotic arm 510, as set forth in FIG. 6. The robotic arm 510 may hold the card body 110 between cutter 500 (e.g., a laser cutter or wire cutter). The cutter 500 may be fixed perpendicular to the robotic arm 510. The robotic arm 510 moves the card body 110 through the cutter 500 to form the first portion 130 of the slot 125 at the about 45 degree angle. After cutting the first portion 130 of the slot 125, the robotic arm 510 does not translate the card, but rotates the card about 90 degrees (i.e., from about −45 degrees to about +45 degrees). The rotation of the card body 110 below the cutter 500 forms the second portion 140 of the slot 125. The robotic arm 510 then translates the card body 110 again to form the third portion 150 of the slot 125 at the about 135 degree angle. In particular, after the rotation is complete, the cutting may proceed about parallel to the first portion 130 of the slot 125. The third portion 150 of the slot 125 may be fabricated by cutting at an opposite about 45 degree angle from the plane of the card (i.e., about 135 degree angle). The third portion 150 of the slot 125 may be in a range of between about 0.625 to 0.690 inches and end at a far edge of an aperture within a pocket (the far aperture edge is the aperture edge farthest from the card edge where the slot 125 starts).

The slot 125 then may be filled with non-conductive filler. The excess filler may then be polished or buffed off the surface (front and back) of the card body 110 and off the edges. Filling the slot 125 may also include vacuum pulling glue into the slot 125 and curing the glue. A DLC or metal coating may be applied to the card body 110. As discussed above with respect to FIG. 3, a pocket 122 for the EMV chip 102 may be milled out of the card. The pocket 122 may include an aperture 120 in the center of the pocket. The pocket includes a recessed ledge 123 within the pocket and the recessed ledge 123 surrounds the aperture 120. Thus, the EMV chip 102 may rest on the recessed ledge 123, while the center of the EMV chip 102 is suspended over the aperture 120.

In various embodiments, multiple slots 125 may be formed in a sheet of cards prior to cutting out the individual card bodies. In other embodiments, individual card bodies 110 are first cut out of the sheet prior to forming the slot 125 in each card body 110. The slots 125 are formed in each transaction card. After all of the milling and cutouts are completed on the individual cards, multiple cards are then embedded in PVC in a sheet format on a tray (e.g., 16 cards per tray). The multiple cards are maintained in the sheet format with 2-5 tabs per card to lock the card in place. The multiple cards are maintained in a sheet format to allow for more accurate alignments, more accurate registration, easier card art and more efficient printing on the cards. A magnetic stripe 206 is mounted onto a non-stick sheet. Glue is used and laminate is melted into the magnetic stripe 206 cutout. A computerized number control (CNC) lathe machine is used to cut and polish the magnetic stripes 206. The top and bottom non-stick may easily peel off, and the cards can be popped out.

As used herein, a "transaction card" may include any surface, object, device or any part of a card that includes a slot 125, regardless of the card's ability to conduct a transaction. Slot 125 may be within the card body or any other part of the card. A "transaction card" may also include any device that acts as a contactless antenna and/or focuses EM waves. The disclosure may also apply to minimizing or preventing breakage of any surface, object or device. For example, a transaction card may be a charge card, credit card, debit card, awards card, prepaid card, telephone card, smart card, magnetic stripe card, bar code card, transponder, radio frequency card and/or the like. The transaction card may have an associated account number (e.g., embossed, printed, and/or accessed), which cardholders typically present to merchants or use to interact with a machine, as part of a transaction, such as a purchase.

ISO 7810 stipulates that transaction cards in the "ID-1" format be 85.60 mm in width×53.98 mm in height×0.76 mm in thickness (3.370 in×2.125 in×0.03 in) (as the terms width, height, and thickness are further discussed herein). In various embodiments, transaction cards may be standard-sized (i.e., about 3⅜ inches by about 2¼ inches by about 0.03 inches, and/or those dimensions specified in ISO 7810 and ISO 7811, for example, for an "ID-1" card) or any other size specified in ISO 7810 and ISO 7811 or any other size or configuration still usable as a transaction card or configured to interact with another card or device (e.g., a larger transaction card, small transaction card, reduced size transaction card, foldable transaction card, the card being part of another device, the card being removed from another device). Moreover, the transaction card may have a magnetic stripe 206, an embedded EMV chip 102, a signature panel, a holographic image, and/or any feature typically contained on or within a transaction card. Various foldable cards and/or transaction cards of non-traditional size may be used as the transaction card in various embodiments.

A card body 110 may refer to a material in any shape or thickness. The card body 110 may be shaped substantially as a transaction card and/or a layer of a transaction card. In that regard, the card body may be generally sized as a transaction card though it may not meet ISO 7810 and/or 7811 dimensions. A layer of a transaction card may refer to a material that has the length and width (as defined herein) substantially near the ISO 7810 and/or 7811 specified dimensions but has a thickness (as defined herein) less than the ISO 7810 and/or 7811 specified dimensions. In that regard, a transaction card 100 may comprise a layer of metal that is, in various embodiments, bonded, laminated and/or otherwise coupled to another layer (or a transaction card having a metal layer and another layer such as a ceramic layer). In various embodiments, a metallic card body may have the width and height of an ID-1 card as set forth in ISO 7810 and ISO 7811, but may have a thickness that is less than the thickness of an ID-1 card as set forth in ISO 7810 and ISO 7811. For example, a metallic card body may have a thickness of less than 0.03 in. and/or less than 0.025 in.

The card body 110 may be polished and/or buffed to a glossy, highly reflective finish. The finishes may include, for example, ceramic, PVD, DLC, ink, chemical process or any other finishing technique. In various embodiments, one or more cutters or lasers may be used to alter the card body. For example, a laser may emit a focused beam of light having a given power output. Thus, a laser directed at a surface may have varying effects on the surface based upon the power output of the laser and the duration of exposure. Lasers may emit a light over a small area, providing the ability for precision works. Moreover, lasers may be accurately and precisely controlled via electronic control systems for manufacturing ease. A typical laser may be obtained from Virtek Laser Solutions, Inc. In various embodiments, a 1064 nm, 25 W diode pumped $YVO_4$ laser may be used.

The effect a laser may have on a metal material depends in part on the power output of the laser and the duration of exposure. For example, exposure for a short time to a low power laser may alter the surface characteristics of a metal material, for example, changing a glossy finished surface to a matte finish (i.e., one that is not as reflective to visible light). In contrast, exposure to a high power output laser for a first duration, or a lower power output laser for a second duration that is longer than the first duration, may cause a perforation of the metal material. In that regard, various laser processes may be characterized by their effect on a metal material. These various techniques may be applied, in various embodiments, in the manufacture of a card body or the entire transaction card. Lasers can provide marking of metal materials at depths of as low as about 0.0003 inches. Though lasers may have various power outputs, for purposes of explanation, various laser processes may be characterized by the total power during the exposure to a metal material. Stated another way, the total power of laser exposure to a surface may be thought of as the amount of laser energy applied per unit time of exposure.

With respect to FIG. 3, card body 110 may comprise pocket 122. Pocket 122 may comprise an indentation or other depression that is offset from primary surface 204. EMV chip 102 is disposed in pocket 122. The position of EMV chip 102 on the card body 110 may be standardized by industry practice (for example, ISO 7816). EMV chip 102 may include an integrated antenna so that EMV chip 102 may facilitate wireless transactions. EMV chip 102 may comprise any suitable recordable media, for example, an integrated circuit. EMV chip 102 may comply with one or more industry standards such as ISO 7819 and ISO 7816 to provide "smartcard" functionality to transaction card 100. In that regard, EMV chip 102 may aid in the facilitation of financial transactions. Many jurisdictions may now prefer a EMV chip 102 in transaction cards. EMV chip 102 may be disposed onto a card body in a variety of ways. Pocket 122 may be formed so that when EMV chip 102 is disposed therein, a surface of EMV chip 102 will be flush or substantially flush with primary surface 204. An adhesive may be disposed in the pocket 122 or on the EMV chip 102 prior to positioning an EMV chip 102 into a pocket 122 in card body 110. Any suitable adhesive may be used. For example, ABLEBOND 931-1T1N1 may be used for this purpose. Further, in various embodiments, an insulating material may be disposed in the card body 110 pocket 122 to be positioned between the EMV chip 102 and the card body 110 so as to electrically insulate the EMV chip 102 and the card body. An adhesive may act as an insulating material. Any insulator may be used for this purpose.

In various embodiments, as set forth in FIG. 3, card body 110 may comprise any material. In various embodiments, the material for the card body may be a metallic material comprising any suitable metal and/or metal alloy, including titanium, titanium alloy, aluminum, aluminum alloy stainless steel, tin, zinc, copper, nickel, chromium, tungsten, brass and/or nickel/chromium alloys.

Card body 110 may have card backer applied to card body 110 comprised of a laminate, print layer and/or coating. The card backer may include any of the surfaces disclosed in FIG. 2 such as, for example, a diamond clear coating 210, raised letter printing 215, black ceramic coating 220, a glue lam 230, a black PVC print layer 235 and a clear laminate 240 with a magnetic stripe 206 or signature panel (e.g., milled within the laminate). A card backer may refer to a transaction card shaped material in any size, shape or thickness. The card backer may be shaped substantially as a transaction card and/or a layer of a transaction card. In that regard, the card backer may be generally sized as a transaction card though it may not meet ISO 7810 and/or 7811 dimensions. A card backer may have the length and width (as defined herein) substantially near the ISO 7810 and/or 7811 specified dimensions but has a thickness (as defined herein) less than the ISO 7810 and/or 7811 specified dimensions. In that regard, a transaction card, according to various embodiments, may comprise a card backer coupled to (by bonding, lamination, and/or other suitable method) a card body. In various embodiments, a card backer may have the width and height of an ID-1 card as set forth in ISO 7810 and ISO 7811, but may have a thickness that is less than the thickness of an ID-1 card as set forth in ISO 7810 and ISO 7811. For example, a card backer may have a thickness of less than 0.003 in., less than 0.02 in., 0.18 in., less than 0.015, and between 0.001 inches and 0.02 inches.

In various embodiments, a metallic card body may be coated with a protective coating. The coating may be deposited via physical vapor deposition (PVD). In various embodiments, the body may be coated with a protective coating such as a diamond like carbon (DLC) coating. A DLC coating may be generally amorphous, though portions of a DLC coating may have a crystalline structure. For example, a DLC coating may comprise a mixture of forms of carbon, including graphite and diamond. In that regard, carbon in a DLC coating may contain hybridized carbon. A DLC coating may comprise a carbon composition that exhibits high hardness, corrosion resistance, low coefficient of friction (~0.02 to 0.2), and high electrical resistivity. A DLC coating may be between 1 micron and 50 microns thick, between 2 microns and 25 microns thick, and between 2 microns and 15 microns thick. A DLC coating may be applied by PVD process, for example, cathodic arc PVD, sputtering, or plasma assisted chemical vapor deposition (CVD).

In various embodiments, a metal-containing transaction card may have a metallic card body and a DLC coating that may provide improved corrosion resistance relative to metallic transaction cards without a DLC coating.

Secondary surface 208 may comprise a feature or marking. Feature may include account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters.

As used herein, "finishing" may refer any device or process (e.g., application of a laser to a surface or CNC machining) to remove and/or disrupt a glossy and/or highly reflective finish. For example, laser finishing may impart a matte finish on a metal material surface.

As used herein, "marking" may refer to any device or process (e.g., application of a laser to a surface or CNC machining) imparts a visible disruption to the surface. For example, removing a portion of material from the surface of the card body. In various embodiments, account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters may be marked onto a surface. For example, laser marking may impart visible features to a metal material surface such as readable text onto a metal material surface. Laser marking involves the application of more total power from a laser than laser finishing.

As used herein, "etching" may refer any device or process (e.g., application of a laser to a surface or CNC machining) that imparts an indentation to the surface. In particular, etching may be used to impart various graphic features onto a surface of a card body. In various embodiments, a logo, a decorative border, a brand name, and/or other features may be etched onto a surface. For example, laser etching may remove a portion of metal material from a metal material surface. In that regard, laser marking may impart visible features to a metal material surface that have a palpable depth. Laser etching involves the application of more total power from a laser than laser marking.

As used herein, "perforation" may refer any device or process for (e.g., application of a laser to a surface or CNC machining) to bore a hole completely through the card body. For example, perforation may be used to impart various graphic features onto a card body. In various embodiments, a logo and/or other features may be formed onto a card body. For example, laser perforation may completely remove metal material from a metal material surface, leaving a through hole. In that regard, laser perforation may impart visible features to a metal material surface that traverse a thickness (as defined herein) of a card body. Laser perforation involves the application of more total power from a laser than laser etching. Laser cutting may be performed with similar laser parameters as laser perforation, but laser cutting may be used to remove metal material in any suitable manner.

Marked feature 210 is disposed on primary surface 204. Marked feature may be produced by laser marking, as discussed above. In various embodiments, marked feature may include account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters.

Etched feature 202 is disposed on primary surface 204. Etched feature may be produced by laser etching, as discussed above. In various embodiments, etched feature may include a logo, and/or a decorative feature such as a border, though other patterns are contemplated herein.

Secondary surface 208 may comprise fill panel 108. Fill panel 108 may comprise a metal material, for example, the same metal material of card body 110. Fill panel 108 may have thickness from about 0.001 in to about 0.01 in, about 0.003 in to about 0.009 in and/or about 0.008 in, wherein the term about may refer to +/−0.0001 in. Fill panel 108 may be coupled to a card backer by an adhesive or other suitable coupling method.

Fill panel 108 may comprise a gloss/matte feature. A gloss/matte feature may comprise a feature that comprises a gloss portion and matte portion. Together, gloss portion and matte portion may be configured to display account indicia such as an account number, an accountholder's name, a loyalty notation (e.g., "Member Since 2001"), an expiration date, a signature, a brand name, or other indicia such as legal notices, regulatory compliance messages, phone numbers, URLs, email addresses, trademarks, pictures, graphics, bar codes, CCID code or any alphanumeric characters. In that regard, alphanumeric characters may be formed as gloss portion against background of matte portion.

A magnetic stripe 206 may be disposed on secondary surface 208. Magnetic stripe 206 may comprise any suitable recordable media. Magnetic stripe 206 may be encoded via any encoding processes commonly used to encode the transaction cards. Specifically, either or both of the recordable media, such as the magnetic stripe 206 and/or the EMV chip 102, may be encoded to provide transaction card 100 with information beneficial to facilitate a financial transaction. The recordable media may be read via a magnetic stripe reader or a EMV chip 102 reader.

Manufacturing a transaction card 100 or card body 110 (e.g., that contains metal) may include machining, grinding, casting, forging, water jet cutting, die cutting, laser cutting, plasma cutting and stamping, as well as by additive manufacturing techniques. The card body 110 may be subject to DLC coating. A DLC coating may be applied by a PVD process, for example, cathodic arc PVD, sputtering, or plasma assisted chemical vapor deposition (CVD). The DLC coating may be applied to primary surface 204, secondary surface 208 or both.

The card body 110 may be subject to treating. As discussed above, treating may comprise finishing, marking, etching, and perforation. For example, laser finishing, laser marking, laser etching, and laser perforation may be performed on the DLC coated card body 110 to create the various features described in connection with those techniques. In various embodiments, a single laser is used for laser treating and set to different total power outputs to accomplish each task. Certain indicia, such as a cardholder's signature, may be captured digitally and used as a digital template to guide the laser in laser marking the cardholder's signature. The DLC coated card body 110 may have recordable media applied such as a magnetic stripe 206. A magnetic stripe 206 may be disposed on the DLC coated card body using an adhesive or other suitable coupling media. An EMV chip 102 may be installed in pocket 122.

Metal-containing transaction cards that are DLC coated have a number of advantages over conventional transaction cards comprised of plastic or metal. DLC coatings may be very hard and thus DLC coated metal-containing transaction cards may resist scratching. DLC coated metal-containing transaction cards may be more resistant to deformation than plastic or metal. Combinations of various features found in DLC coated metal-containing transaction cards described herein may be very difficult to reproduce without costly equipment and know-how. Thus, the risk of fraudulent reproduction of DLC coated metal-containing transaction cards is reduced, thus leading to more security. DLC coated metal-containing transaction cards may further provide a luxurious look and feel, which may be beneficial in the marketplace.

In various embodiments, transaction card 100 and related systems (e.g., POS terminal) may be configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

As shown in FIG. 1, an account number 210 may appear on the card. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, metal, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a geographic indicator and/or the like. The card may be associated with, have access to or include a rewards account, charge account, credit account, debit account, prepaid account, telephone card, embossed card, smart card, magnetic stripe card, bar code card, transponder, radio frequency card, key card, access card or an associated account. As used herein, any terms similar to "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The card or associated systems may include or interface with any accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the card, system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled. For example, by: a network of electronic circuitry that is printed or otherwise incorporated onto or within the transaction instrument (and typically referred to as a "smart card"); a fob having a transponder and an RFID reader; and/or near field communication (NFC) technologies.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In various embodiments, cards, components, modules, and/or engines of the system may be implemented in association with micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of fabricating a card body for a transaction card, comprising:
    positioning the card body at a first angle with respect to a cutter;
    creating a first portion of a slot in the card body at the first angle relative to a plane of the card body;
    rotating at least one of the card body or the cutter to a second angle relative to the plane of the card body to create a second portion of the slot;
    creating a second portion of the slot in the card body at the second angle; and
    wherein the slot created in the card body extends from a first edge of the card body to a second edge of an aperture of a pocket within the card body.

2. The method of claim 1, further comprising:
    rotating at least one of the card body or the cutter to a third angle relative to the plane of the card body to create a third portion of the slot that connects the first portion of the slot with the second portion of the slot; and
    creating the third portion of the slot in the card body at the third angle.

3. The method of claim 2, wherein the card body or the cutter is rotated such that the third portion of the slot in the card body is perpendicular to the first portion or the second portion.

4. The method of claim 1, further comprising filling the slot with a non-conductive filler.

5. The method of claim 4, wherein filling the slot with a non-conductive filler further comprises vacuum pulling the non-conductive filler into the slot.

6. The method of claim 1, further comprising depositing a diamond like carbon (DLC) coating over at least a portion of the card body.

7. The method of claim 1, further comprising depositing a ceramic material over at least a portion of the card body.

8. The method of claim 1, further comprising milling the pocket in the card body.

9. The method of claim 1, further comprising chemically etching the pocket in the card body.

10. The method of claim 1, further comprising laser cutting the pocket in the card body.

11. The method of claim 1, further comprising resting a chip that implements a version of the Europay-Mastercard-Visa (EMV) standard in the pocket of the card body.

12. A system for fabricating a card body for a transaction card, comprising:
    a cutter; and
    a robotic arm, the robotic arm being configured to:
        position the card body at a first angle with respect to a cutter;
        translate the card body across the cutter to create a first portion of a slot in the card body at the first angle relative to a plane of the card body;
        rotate the card body to a second angle relative to the plane of the card body to create a second portion of the slot;
        translate the card body across the cutter to create a second portion of the slot in the card body at the second angle; and
        wherein the slot created in the card body extends from a first edge of the card body to a second edge of an aperture of a pocket within the card body.

13. The system of claim 12, wherein the robotic arm is further configured to:
    rotate the card body to a third angle relative to the plane of the card body; and
    translate the card body across the cutter to create a third portion of the slot at the third angle, the third portion of the slot connecting the first portion of the slot with the second portion of the slot.

14. The system of claim 13, wherein the robotic arm is further configured to translate the card body across the cutter to create the third portion of the slot in parallel to the first portion of the slot.

15. The system of claim 12, wherein the robotic arm is further configured to rotate the card body ninety (90) degrees to rotate the card body from the first angle to the second angle.

16. The system of claim 12, wherein the cutter is positioned perpendicular to the robotic arm.

17. The system of claim 12, wherein the cutter is a laser cutter.

18. A system for fabricating a card body for a transaction card, comprising:
- a jig that comprises a mounting device, wherein the mounting device comprises a lifting table with a hinge on a first end of the lifting table and a guide handle on a second end of the lifting table;
- a card locking mechanism that holds the transaction card against a front face of the lifting table;
- an angled block that is rotatably connected to the lifting table by the hinge;
- a slide block, wherein the angled block is mounted on the slide block; and
- a cutter fixed perpendicular to the mounting device of the jig.

19. The system of claim 18, wherein the cutter is a laser cutter.

20. The system of claim 18, wherein the jig is configured to move the transaction card through the cutter.

\* \* \* \* \*